United States Patent [19]

Mandai et al.

[11] 4,380,559

[45] Apr. 19, 1983

[54] METHOD FOR PRODUCING BOUNDARY LAYER SEMICONDUCTOR CERAMIC CAPACITORS

[75] Inventors: Haruhumi Mandai, Nagaokakyo; Kunitaro Nishimura, Youkaichi; Yoshiaki Kohno, Uji; Masami Yamaguchi, Nagaokakyo, all of Japan

[73] Assignee: Murata Manufacturing Co., Ltd., Japan

[21] Appl. No.: 190,711

[22] Filed: Sep. 25, 1980

[51] Int. Cl.³ .......................... H01G 4/10; H01G 4/12
[52] U.S. Cl. ....................................... 427/80; 427/89; 427/126.3; 427/215; 427/217; 427/242; 427/252; 427/251; 427/255.5; 264/61
[58] Field of Search ................ 427/80, 81, 126.3, 185, 427/242, 248.1, 251, 252, 255, 255.3, 255.5, 213, 215, 217, 85, 89; 264/61

[56] References Cited

U.S. PATENT DOCUMENTS

| | | | |
|---|---|---|---|
| 3,442,691 | 5/1969 | Pearson | 427/242 |
| 3,517,644 | 6/1970 | Baer | 427/251 |
| 3,589,935 | 6/1971 | Brill-Edwards | 427/252 |
| 3,824,122 | 7/1974 | Cook | 427/252 |
| 3,958,047 | 5/1976 | Baldi | 427/252 |
| 4,311,729 | 1/1982 | Itakura et al. | 427/80 |

Primary Examiner—Michael R. Lusignan
Assistant Examiner—Richard Bueker
Attorney, Agent, or Firm—Ostrolenk, Faber, Gerb & Soffen

[57] ABSTRACT

A method for producing boundary layer semiconductor ceramic capacitors comprises firing shaped bodies of a semiconductor ceramic material in a neutral or reducing atmosphere, heat-treating the resultant semiconductor ceramic bodies to insulatorize crystal grain boundaries of the semiconductor ceramics, and providing opposite electrodes on surfaces of the heat-treated semiconductor ceramic bodies and is characterized in that said heat-treating is carried out by heating the semiconductor ceramic bodies together with power of an insulatorizing agent with stirring in a neutral or oxidizing atmosphere at a temperature ranging from 950° to 1300° C. As a semiconductor ceramic material, there may be used semiconductor ceramics of a barium titanate system, or of a strontium titanate system, or a complex semiconductor ceramic mainly comprising barium titanate or calcium titanate and strontium titanate. This method enables one to produce boundary layer semiconductor ceramics as good quality with small standard deviation and high yield.

10 Claims, No Drawings

METHOD FOR PRODUCING BOUNDARY LAYER SEMICONDUCTOR CERAMIC CAPACITORS

FIELD OF THE INVENTION

This invention relates to a method for producing boundary layer type semiconductor ceramic capacitors.

BACKGROUND OF THE INVENTION

The boundary layer type semiconductor ceramic capacitors are characterized by large apparent permittivity as compared with the conventional ceramic capacitors, and therefore, they have been used widely.

It is known that such a semiconductor ceramic capacitors may be produced by a process comprising the steps of: firing, in a neutral or reducing atmosphere, shaped bodies of a ceramic material of a barium titanate or strontium titanate system in which is incorporated at least one valency control element such as a rare earth element, Nb, Sb or Bi, heat-treating the resultant semiconductor ceramic bodies to which an insulatorizing agent such as metal or a compound thereof, for example, copper, bismuth, manganese, lead or their compounds, is applied, and then forming opposite electrodes on surfaces of the heat-treated semiconductor ceramic bodies.

When heat-treating the semiconductor ceramic bodies to insulatorize the crystal grain boundary of the semiconductor ceramics, the semiconductor ceramic bodies are applied with a paste of the insulatorizing agent, placed side by side or one on another in a saggar, and then heated in a furnace. In this process, however, there is a temperature difference in the sagger during heat-treatment or an atmosphere difference in the furnace due to the evaporated metal or its compounds, resulting in large scattering in the characteristics of the produced boundary layer semiconductor ceramic capacitors. Further, firing tends to cause partial welding between the semiconductor ceramic bodies. For these reasons, it is difficult to produce boundary layer semiconductor ceramic capacitors of good quality with high yield.

SUMMARY OF THE INVENTION

It is therefore an object of the present invention to provide a method for production of boundary layer type semiconductor ceramic capacitors which makes it possible to produce the boundary layer type semiconductor ceramic capacitors with a small amount of scatter in the characteristics and high yield.

According to the present invention, there is provided a method for producing boundary layer semiconductor ceramic capacitors comprising the steps of: firing shaped bodies of a semiconductor ceramic material in a neutral or reducing atmosphere, heat-treating the resultant semiconductor ceramic bodies to insulatorize crystal grain boundaries of the semiconductor ceramics, and providing opposite electrodes on surfaces of the heat-treated semiconductor ceramic bodies; characterized in that the heat-treatment of the resultant semiconductor ceramic bodies is carried out by heating the semiconductor ceramic bodies together with powder of an insulatorizing agent with stirring in a neutral or oxidizing atmosphere.

The semiconductor ceramics obtained by firing in the neutral or reducing atmosphere may be of the barium titanate system, or strontium titanate system, or complex semiconductor ceramics mainly comprising barium titanate and strontuum titanate, or complex semiconductor ceramics mainly comprising strontium titanate and calcium titanate.

The insulatorizing agent which is mixed with semiconductor ceramic bodies and insulatorizes the crystal grain boundaries thereof includes metals such as, for example, bismuth, copper, lead, manganese, iron and boron, and metal compounds such as, for example, oxides of the above metals.

Although the semiconductor ceramic bodies and the powder of insulatorizing agent are heat-treated with stirring in a neutral or oxidizing atmosphere, it is preferred to carry out the heat-treatment at a temperature ranging from 950° to 1300° C. A temperature lower than 950° C. causes insufficient diffusion of the insulatorizing agent so that it is impossible to sufficiently increase the apparent permittivity and insulating resistance. A temperature beyond 1300° C. causes vigorous evaporation of the insulatorizing agent resulting in the decrease of the capacitance of the product.

The stirring of the semiconductor ceramic body together with the powder of the insulatorizing agent may be carried out by rotating or moving a vessel back and forth and/or right and left after puting the semiconductor ceramic body and the powder of the insulatorizing agent in the vessel.

The present invention will be further apparent from the following description which is given by way of example only.

EXAMPLE

A mixture of 99.5 mole % of $SrTiO_3$ and 0.5 mole % of $Y_2O_3$ is presintered at 1150° C. for 2 hours in air, crushed, ground, granulated in the conventional manner after adding a binder, and then shaped into discs having a diameter of 4.3 mm and a thickness of 0.5 mm under a pressure of 750 to 2000 $Kg/cm^2$. The shaped discs are prefired in air at 1150° C. for 2 hours, and then fired at 1460° C. for 3 hours in a reducing atmosphere consisting essentially of 90 vol. % of nitrogen and 10 vol. % of hydrogen. The resultant strontium titanate system semiconductor ceramic discs have a diameter of 3.5 mm and a thickness of 0.4 mm.

One thousand of the thus obtained semiconductor ceramic discs are put in a cylindrical saggar together with an insulatorizing agent powder consisting of 48 wt % of $Bi_2O_3$, 48 wt % of $Pb_3O_4$ and 4 wt % of CuO. The amount of the insulatorizing agent powder is 20 wt % of the semiconductor ceramic discs by dry weight. The discs and powder are heat-treated in an oxidizing atmosphere at 1100° C. for 1 hour with stirring by rotating the saggar in a furnace. The rate of mutual welding of the heat-treated semiconductor ceramic discs is 0%.

Silver paste is applied on opposite surfaces of the heat-treated semiconductor ceramic discs to form electrodes having a 3.0 mm diameter and 2.5 mm diameter in size, and the discs are baked at 800° C. for 30 minutes to finish boundary layer semiconductor ceramic capacitors.

The resultant capacitors have a mean capacitance of 2100 pF with a standard deviation of 48 pF.

COMPARATIVE EXAMPLE

For comparison, boundary layer semiconductor ceramic capacitors were prepared in the conventional manner described below, and subjected to the measurement of the welding rate, capacitance and its standard deviation.

The semiconductor ceramic discs prepared in the above example have applied on the surfaces a metal oxide paste consisting of 24 wt % of $Bi_2O_3$, 24 wt % of $Pb_3O_4$ and 2 wt % of CuO, and 50 wt % of varnish, put side by side in a saggar, and then heat-treated in an oxidizing atmosphere at 1100° C. for 1 hour.

The mutual welding rate of the heat-treated semiconductor ceramic discs is 17.0%.

The heat-treated semiconductor ceramic discs are provided electrodes in the same manner as described in the above example to finish the boundary layer semiconductor ceramic capacitors. The capacitors have a mean capacitance of 2010 pF with the standard deviation of 180 pF.

As will be understood from the above, according to the present invention, there is no mutual welding of the semiconductor ceramics by the heat-treatment. Also, the present invention makes it possible to produce boundary layer semiconductor ceramics with small standard deviation. It is believed that this is the result of the insulatorizing agent diffusing evenly into the crystal grain boundaries of the semiconductor ceramics during the heat-treatment, and that the insulatorizing of the crystal grain boundaries is simultaneously promoted in the whole semiconductor ceramic discs put in the saggar.

It is to be understood that the described embodiment has been illustrated as an example of the present invention, and that the invention is not limited to the above embodiment, and that many changes and modification can be made without departing from the nature and spirit of the invention. For example, the semiconductor ceramics of the strontium titanate may be altered with the semiconductor ceramics of the barium titanate system, complex semiconductor ceramics of strontium titanate and barium titanate or calcium titanate.

What is claimed is:

1. A method for producing boundary layer semiconductor ceramic capacitors, comprising the steps of:
   firing shaped bodies of a semiconductor ceramic material in a neutral or reducing atmosphere;
   heat-treating the resultant semiconductor ceramic bodies to insulatorize crystal grain boundaries of the semiconductor ceramics; and
   providing opposite electrodes on surfaces of the heat-treated semiconductor ceramic bodies;
   characterized in that said heat-treating is carried out by heating the semiconductor ceramic bodies together with powder of the insulatorizing agent with stirring in a neutral or oxidizing atmosphere.

2. The method according to claim 1 wherein the semiconductor ceramic material is a barium titanate system semiconductor ceramic.

3. The method according to claim 1 wherein the semiconductor ceramic material is a strontium titanate system semiconductor ceramic.

4. The method according to claim 1 wherein the semiconductor ceramic material is a complex semiconductor ceramics mainly comprising barium titanate and strontium titanate.

5. The method according to claim 1 wherein the semiconductor ceramic material is a complex semiconductor ceramics mainly comprising strontium titanate and calcium titanate.

6. The method according to claim 1 wherein the heat-treating is carried out at a temperature ranging from 950° to 1300° C.

7. The method of claim 6 wherein the semiconductor ceramic material is a strontium titanate system semiconductor ceramic.

8. The method of claim 7 wherein the insulatorizing agent comprises $Bi_2O_3$, $Pb_3O_4$ and CuO.

9. The method of claim 8 wherein said heat-treating is carried out in a vessel and said stirring is effected by agitating said vessel.

10. The method of claim 1 wherein said heat-treating is carried out in a vessel and said stirring is effected by agitating said vessel.

* * * * *